US012654677B2

(12) United States Patent
Habu et al.

(10) Patent No.:     US 12,654,677 B2
(45) Date of Patent:         Jun. 16, 2026

(54) HYBRID ELECTRIC VEHICLE

(71) Applicant: SUBARU CORPORATION, Tokyo (JP)

(72) Inventors: Junji Habu, Tokyo (JP); Tomonori Kashiwadate, Tokyo (JP); Tetsu Matsuzaki, Tokyo (JP); Takumu Ishida, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 253 days.

(21) Appl. No.: 18/721,347

(22) PCT Filed: Jan. 20, 2023

(86) PCT No.: PCT/JP2023/001770

§ 371 (c)(1),
(2) Date: Jun. 18, 2024

(87) PCT Pub. No.: WO2024/154355

PCT Pub. Date: Jul. 25, 2024

(65) Prior Publication Data

US 2026/0152172 A1      Jun. 4, 2026

(51) Int. Cl.
*B60W 20/40*          (2016.01)
*B60W 10/02*          (2006.01)
*B60W 10/06*          (2006.01)

(52) U.S. Cl.
CPC .......... *B60W 20/40* (2013.01); *B60W 10/026* (2013.01); *B60W 10/06* (2013.01); *B60W 2510/0638* (2013.01); *B60W 2710/024* (2013.01)

(58) Field of Classification Search
CPC .... B60W 20/40; B60W 10/026; B60W 10/06; B60W 2510/0638; B60W 2710/024
See application file for complete search history.

(56) References Cited

U.S. PATENT DOCUMENTS

| | | | |
|---|---|---|---|
| 2016/0016580 A1* | 1/2016 | Johri ..................... | B60W 20/40 |
| | | | 180/65.265 |
| 2022/0307440 A1* | 9/2022 | Oh ........................ | F02D 41/009 |
| 2023/0331213 A1* | 10/2023 | Ravichandran .......... | B60K 6/38 |

FOREIGN PATENT DOCUMENTS

JP          2015113912 A   *   6/2015

OTHER PUBLICATIONS

Machine translation of JP 2015113912 A (Year: 2015).*
International Search Report issued in corresponding International Patent Application No. PCT/JP2023/001770, dated Feb. 21, 2023.

* cited by examiner

*Primary Examiner* — Farhana Pervin
(74) *Attorney, Agent, or Firm* — Rimon P.C.

(57)                ABSTRACT
A vehicle includes an engine, a starter motor, a torque converter, a lock-up clutch configured to perform lock-up, a traveling motor, and a controller. The controller is configured to perform processing including: switching between an engine traveling mode in which the vehicle travels using the engine and a motor traveling mode in which the vehicle travels using the traveling motor; and prohibiting, in response to a request to switch from the motor traveling mode to the engine traveling mode, the lock-up when a rotational speed of the engine is lower than a self-recovery lower limit rotational speed and higher than a starter motor drive upper limit rotational speed.

4 Claims, 7 Drawing Sheets

HYBRID ELECTRIC VEHICLE

CROSS-REFERENCE TO RELATED APPLICATIONS

This application is the U.S. National Phase under 35 U.S.C. § 371 of International Application No. PCT/JP2023/001770, filed on Jan. 20, 2023.

TECHNICAL FIELD

The disclosure relates to a vehicle.

BACKGROUND ART

For example, in response to a request to switch from a motor traveling mode to an engine traveling mode, an engine of a hybrid vehicle disclosed in Patent Document 1 autonomously starts at a time of fuel injection and ignition if the rotational speed of the engine is equal to or higher than a predetermined rotational speed. On the other hand, if the rotational speed of the engine is lower than the predetermined rotational speed, the hybrid vehicle waits until the rotational speed of the engine sufficiently decreases and starts the engine using a starter motor.

CITATION LIST

Patent Literature

Patent Document 1: JP 2015-113912 A

SUMMARY

Technical Problem

For support of comfortable driving of a driver who drives the vehicle, so-called lock-up in which a crankshaft and a turbine shaft are engaged with each other by a lock-up clutch may be performed. However, if the lock-up is performed when the rotational speed of the engine is lower than a self-recovery lower limit rotational speed and higher than a starter motor drive upper limit rotational speed at a time of the request to switch from the motor traveling mode to the engine traveling mode, the rotational speed of the engine may not decrease and the engine may not be started.

An object of the disclosure is to provide a vehicle capable of appropriately starting an engine.

Solution to Problem

In order to solve the above problem, a vehicle according to the disclosure includes:

an engine;

a starter motor that starts the engine;

a torque converter that amplifies torque of a crankshaft coupled to the engine and transmits the torque to a turbine shaft, a lock-up clutch that engages the crankshaft with the turbine shaft to perform lock-up;

a traveling motor, and a controller, in which the controller includes:

one or more processors; and one or more memories coupled to the one or more processors, the one or more processors are configured to execute processing including:

switching between an engine traveling mode in which the vehicle travels using the engine and a motor traveling mode in which the vehicle travels using the traveling motor; and prohibiting, in response to a request to switch from the motor traveling mode to the engine traveling mode, the lock-up when a rotational speed of the engine is lower than a self-recovery lower limit rotational speed and higher than a starter motor drive upper limit rotational speed.

Advantageous Effects of Invention

According to the disclosure, it is possible to appropriately start an engine.

DESCRIPTION OF EMBODIMENTS

A preferred embodiment of the disclosure will be described in detail below with reference to the accompanying drawings. The dimensions, materials, specific numerical values, and the like illustrated in the embodiment are merely examples to facilitate understanding and are not intended to limit the embodiment of the disclosure unless otherwise stated. Note that in the present specification and the drawings, redundant descriptions with respect to elements having substantially the same function and configuration are omitted because the same reference signs will be used, and elements that are not directly related to the embodiment of the disclosure are omitted from the drawings.

Figure 1:
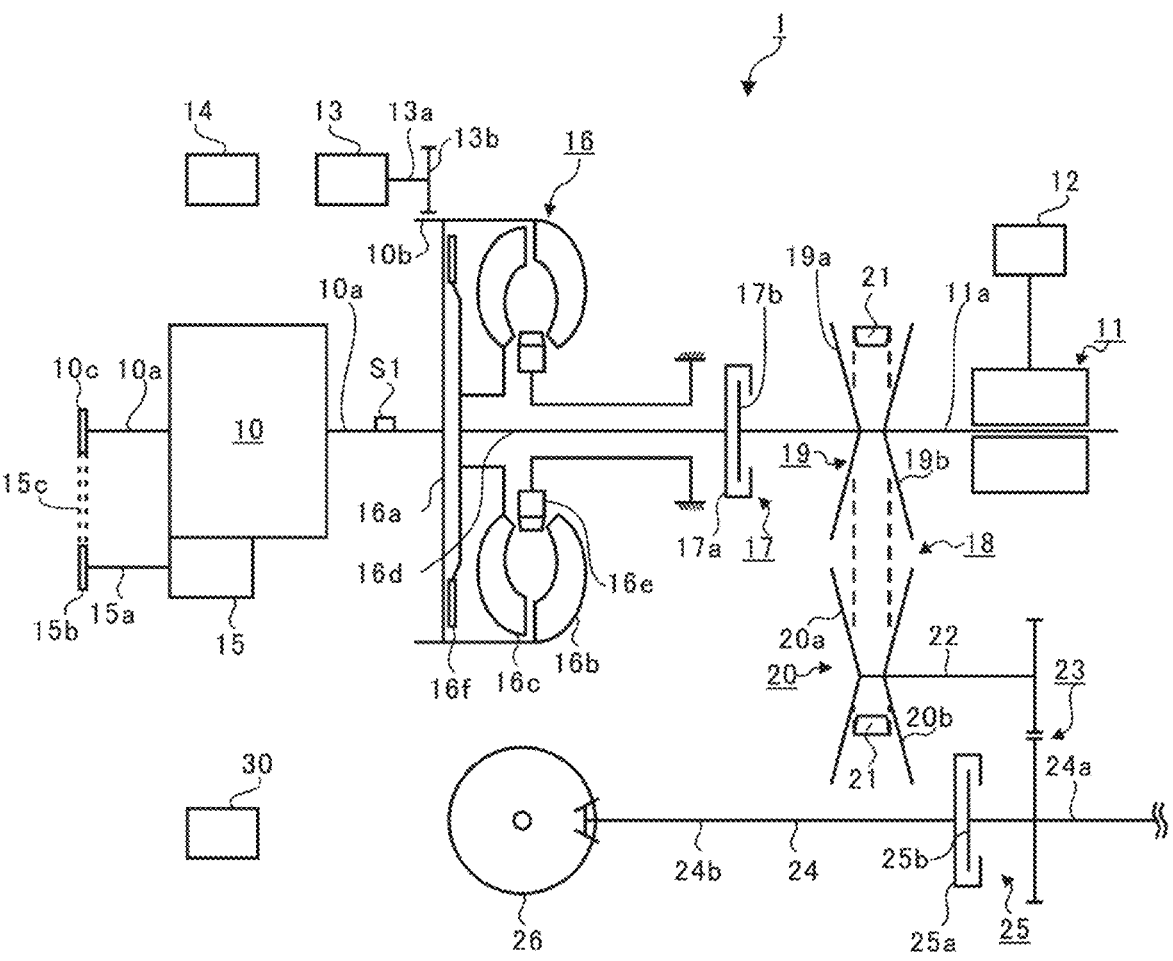
FIG. 1 is a diagram illustrating a schematic configuration of a vehicle.

FIG. 1 is a diagram illustrating a schematic configuration of a vehicle 1. The vehicle 1 is a hybrid vehicle such as a hybrid electric vehicle (HEV) and includes an engine 10 and a traveling motor 11. The vehicle 1 may further include various components in addition to components described in the present embodiment.

In the engine 10, a crankshaft 10a is disposed so as to pass through the inside thereof, and a piston is reciprocated by an explosion pressure in a combustion chamber to rotate the crankshaft 10a. The crankshaft 10a is provided with a crank angle sensor S1. The crank angle sensor S1 measures the rotational speed of the crankshaft 10a, that is, the rotational speed of the engine 10. A gear 10b and a pulley 10c are fixed to one end of the crankshaft 10a.

The traveling motor 11 is, for example, a synchronous rotary electric machine. When functioning as a power source, the traveling motor 11 rotates a shaft 11a by electric power supplied from a high voltage battery 12. When functioning as a generator, the traveling motor 11 supplies electric power obtained by electric power generation to the high voltage battery 12, thereby charging the high voltage battery 12.

A starter 13 and an integrated starter generator (ISG) 15 are provided in the vicinity of the engine 10. The starter 13 is used to start the engine. Here, the starter 13 is used at a time of first start in an operating cycle. A gear 13b is fixed to a shaft 13a protruding from the inside of the starter 13. The gear 13b meshes with the gear 10b provided at the outer periphery of a torque converter 16 described below, and thus power is transmitted between the shaft 13a and the crankshaft 10a.

The ISG 15 assists a driving force of the engine 10. In addition, the ISG 15 functions as a starter motor for the engine 10 when the engine 10 is stopped such as when the engine 10 is in an idle reduction state. When functioning as a starter motor, the ISG 15 is rotationally driven by electric power supplied from an auxiliary battery 14. Since a belt 15c is stretched from a pulley 15b provided at a shaft 15a to the pulley 10c, a driving force of the ISG 15 is transmitted to the crankshaft 10a via the shaft 15a, the pulley 15b, and the pulley 10c, and the engine 10 is started. The ISG 15 also functions as an alternator. When the ISG 15 functions as an alternator, a driving force of the engine 10 is transmitted to the shaft 15a via the crankshaft 10a, the pulley 10c, the belt 15c, and the pulley 15b, and electric power is generated. The ISG 15 charges the auxiliary battery 14 with the electric power obtained by the electric power generation.

Moreover, a transmission 18 is coupled to another end of the crankshaft 10a via the torque converter 16 and an input clutch 17.

The torque converter 16 includes a front cover 16a coupled to the crankshaft 10a and a pump impeller 16b fixed to the front cover 16a. In the front cover 16a, a turbine runner 16c is disposed to face the pump impeller 16b. A turbine shaft 16d is coupled to the turbine runner 16c. A stator 16e is disposed at the inner peripheral side between the pump impeller 16b and the turbine runner 16c, and a working fluid is sealed therein.

In the torque converter 16, the working fluid is delivered toward the outer peripheral side by rotating the pump impeller 16b, and the turbine runner 16c is rotated by delivering the working fluid to the turbine runner 16c. Thus, power is transmitted from the crankshaft 10a to the turbine runner 16c.

The stator 16e changes the flowing direction of the working fluid delivered from the turbine runner 16c and returns the working fluid to the pump impeller 16b to promote the rotation of the pump impeller 16b. Thus, the torque converter 16 can amplify transmission torque to the turbine shaft 16d.

In the torque converter 16, a lock-up clutch 16f fixed to the turbine shaft 16d is disposed to face the inner surface of the front cover 16a. The lock-up clutch 16f can directly engage the crankshaft 10a with the turbine shaft 16d. When the lock-up clutch 16f is not engaged with the crankshaft 10a, the torque of the crankshaft 10a is amplified and transmitted to the turbine shaft 16d. When the lock-up clutch 16f is engaged with the crankshaft 10a, the torque of the crankshaft 10a is transmitted directly to the turbine shaft 16d.

In this way, the torque converter 16 amplifies the torque of the crankshaft 10a and transmits the torque to the turbine shaft 16d. In exchange, the rotational speed of the turbine shaft 16d decreases to be lower than the rotational speed of the crankshaft 10a. In such a case, the driver experiences slippage during which the vehicle 1 is not immediately accelerated even when the driver operates a throttle pedal to increase the rotational speed of the engine 10.

Here, when the lock-up clutch 16f directly engages the crankshaft 10a with the turbine shaft 16d, the function of the torque converter 16 can be canceled. Thus, although the torque from the crankshaft 10a to the turbine shaft 16d is not amplified, the rotational speed of the engine 10 is directly transmitted to the turbine shaft 16d. In this way, the driver can enjoy traveling without having experiencing slippage. Hereinafter, the direct engagement of the crankshaft 10a with the turbine shaft 16d using the lock-up clutch 16f is referred to as lock-up.

In the input clutch 17, a fixed case 17a fixed to the turbine shaft 16d and a moving member 17b fixed to the shaft 11a are disposed to face each other. The moving member 17b is moved toward the fixed case 17a by the oil pressure of working oil supplied from an oil pressure pump (not illustrated).

The input clutch 17 interrupts power transmission between the turbine shaft 16d and the shaft 11a in a released state in which the fixed case 17a and the moving member 17b are separated from each other. The input clutch 17 also transmits power between the turbine shaft 16d and the shaft 11a in a coupled state in which the moving member 17b is pressed against the fixed case 17a by the oil pressure.

The transmission 18 includes a primary pulley 19, a secondary pulley 20, and a belt 21. The primary pulley 19 is provided at the shaft 11a. The secondary pulley 20 is provided at a shaft 22 disposed in parallel with the shaft 11a. The belt 21 includes, for example, a chain belt in which link plates are coupled by pins and stretched between a pair of the primary pulley 19 and the secondary pulley 20. The belt 21 transmits power between the primary pulley 19 and the secondary pulley 20.

The primary pulley 19 includes a fixed sheave 19a and a movable sheave 19b. The fixed sheave 19a and the movable sheave 19b are provided to face each other in the axial direction of the shaft 11a. Further, the facing surfaces of both the fixed sheave 19a and the movable sheave 19b are conical surfaces having substantially conical shapes, and these conical surfaces form a groove over which the belt 21 is stretched.

Similarly, the secondary pulley 20 includes a fixed sheave 20a and a movable sheave 20b. The fixed sheave 20a and the movable sheave 20b are provided to face each other in the axial direction of the shaft 22. Further, the facing surfaces of both the fixed sheave 20a and the movable sheave 20b are conical surfaces having substantially conical shapes, and these conical surfaces form a groove over which the belt 21 is stretched.

The movable sheave 19b of the primary pulley 19 is configured such that the position thereof in the axial direction of the shaft 11a can be changed by the oil pressure of oil supplied from an oil pressure pump (not illustrated) via an oil pressure control valve. Further, the movable sheave 20b of the secondary pulley 20 is configured such that the position thereof in the axial direction of the shaft 22 can be changed by the oil pressure of oil supplied from an oil pressure pump.

In this way, the facing distance between the fixed sheave 19a and the movable sheave 19b can be changed in the primary pulley 19, and the facing distance between the fixed sheave 20a and the movable sheave 20b can be changed in the secondary pulley 20. The groove over which the belt 21 is stretched is narrow at radially inward parts of the fixed sheave 19a, the movable sheave 19b, the fixed sheave 20a, and the movable sheave 20b, and is wide at radially outward parts thereof. Thus, when the facing distances of the conical surfaces are changed and the groove widths over which the belt 21 is stretched are changed, the position at which the belt 21 is stretched is changed.

In the transmission 18, the winding diameter of the belt 21 can be changed by changing the position at which the belt 21 is stretched. Thus, the transmission 18 continuously varies transmission torque between the shaft 11a and the shaft 22.

The shaft 22 is coupled to an output shaft 24 via a gear mechanism 23. The output shaft 24 includes a first output shaft 24a and a second output shaft 24b. The gear mechanism 23 couples the shaft 22 and the first output shaft 24a and rotates these shafts together. The first output shaft 24a and the second output shaft 24b are coupled to each other via an output clutch 25. The output clutch 25 includes a fixed case 25a fixed to the second output shaft 24b and a moving member 25b provided at the first output shaft 24a. The fixed case 25a and the moving member 25b are disposed to face each other. The moving member 25b is moved toward the fixed case 25a by the oil pressure of working oil supplied from an oil pressure pump (not illustrated).

The output clutch 25 interrupts power transmission between the first output shaft 24a and the second output shaft 24b in a released state in which the fixed case 25a and the moving member 25b are separated from each other. In a coupled state in which the moving member 25b is pressed against the fixed case 25a by the oil pressure, the output clutch 25 transmits power between the first output shaft 24a and the second output shaft 24b, and the power is output to a drive wheel 26 coupled to the second output shaft 24b. The output clutch 25 can adjust a torque capacity transmitted between the first output shaft 24a and the second output shaft 24b in accordance with the oil pressure of the working oil.

The output clutch 25 is configured to have a smaller torque capacity than that of the transmission 18 and transmits the torque from the transmission 18 to the drive wheel 26. On the other hand, when torque (disturbance) larger than the torque capacity of the output clutch 25 is input to the output clutch 25 from the drive wheel 26, the moving member 25b slips with respect to the fixed case 25a, so that the transmitted torque is limited to the torque capacity or less. Thus, the output clutch 25 does not transmit, to the transmission 18, torque larger than the torque capacity of the transmission 18. That is, the output clutch 25 functions as a torque fuse.

A controller 30 is coupled to the above-described components including the engine 10 and the traveling motor 11 and controls the entire vehicle 1.

Figure 2:
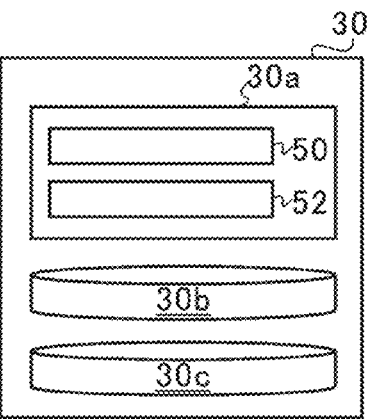
FIG. 2 is a diagram for describing a configuration of a controller.

FIG. 2 is a diagram illustrating a configuration of the controller 30. The controller 30 includes a semiconductor integrated circuit including a processor 30a, a ROM 30b in which a program and the like are stored, and a RAM 30c serving as a work area. In the controller 30, the processor 30a cooperates with the program included in the ROM 30b to function as functional modules such as a mode switch 50 and a lock-up controller 52. The vehicle 1 is also provided with an electronic control unit (ECU), and the ECU also functions as the controller 30.

The mode switch 50 switches the traveling mode of the vehicle 1. Examples of the traveling mode of the vehicle 1 include an EV traveling mode, an engine traveling mode, and a parallel HEV traveling mode. The EV traveling mode is a mode in which the vehicle travels by the driving force of the traveling motor 11 and is also referred to as a motor traveling mode. The engine traveling mode is a mode in which the vehicle travels by the driving force of the engine 10. The parallel HEV traveling mode is a mode in which the vehicle travels by the driving force of the engine 10 and the driving force of the traveling motor 11.

For example, in the EV traveling mode, the engine 10 is stopped, and the rotational speed of the engine 10 is decreased or stopped. Here, when the driver changes their mind to operate a throttle pedal (not illustrated), the mode switch 50 determines that torque used for the vehicle 1 has increased and attempts to start the engine 10.

The mode switch 50 acquires the rotational speed of the engine 10 from the crank angle sensor S1. When the rotational speed of the engine 10 is equal to or higher than a self-recovery lower limit rotational speed, which is the lower limit value of the rotational speed at which the engine 10 can be self-recovered, for example, 850 rpm or more, the mode switch 50 can restart the engine 10 at a time of fuel injection and ignition.

On the other hand, when the rotational speed of the engine 10 is lower than the self-recovery lower limit rotational speed, the mode switch 50 waits until the rotational speed of the engine 10 decreases to an ISG drive upper limit rotational speed, which is the upper limit value of the rotational speed at which driving can be performed by the ISG 15, for example, 400 rpm, and performs engine cranking using the ISG 15 to start the engine 10. Since the ISG 15 functions as a starter motor, the ISG drive upper limit rotational speed can be replaced with a starter motor drive upper limit rotational speed. Then, when the engine 10 is started by the ISG 15 and reaches a predetermined rotational speed, the mode switch 50 switches the traveling mode from the EV traveling mode to the engine traveling mode and stops the traveling motor 11.

However, if lock-up is performed by the lock-up clutch 16f when the rotational speed of the engine 10 is lower than the self-recovery lower limit rotational speed and higher than the ISG drive upper limit rotational speed, the rotational speed of the engine 10 is difficult to decrease. This is because the crankshaft 10a is directly engaged with the turbine shaft 16d by the lock-up clutch 16f and thus the rotational speed of the turbine shaft 16d is directly transmitted to the crankshaft 10a. In such a case, it takes time for the rotational speed of the engine 10 to decrease to the ISG drive upper limit rotational speed, and the mode switch 50 cannot quickly start the engine 10. Thus, in the present embodiment, the lock-up is prohibited in a situation in which the rotational speed of the engine 10 is preferably reduced at an early stage.

The lock-up controller 52 prohibits the lock-up when a request to switch from the motor traveling mode to the engine traveling mode is made, that is, when the following first condition is satisfied in a situation in which the rotational speed of the engine 10 is preferably reduced at an early stage. The prohibition of the lock-up indicates that the engaged lock-up clutch 16f is released or the released state of the lock-up clutch 16f is maintained. When the lock-up is prohibited, the engagement between the crankshaft 10a and the turbine shaft 16d can be avoided, so that the rotational speed of the turbine shaft 16d is not directly transmitted to the crankshaft 10a. Thus, the rotational speed of the engine 10 can decrease at an early stage, and the engine 10 can be started by the ISG 15.

Figure 3:
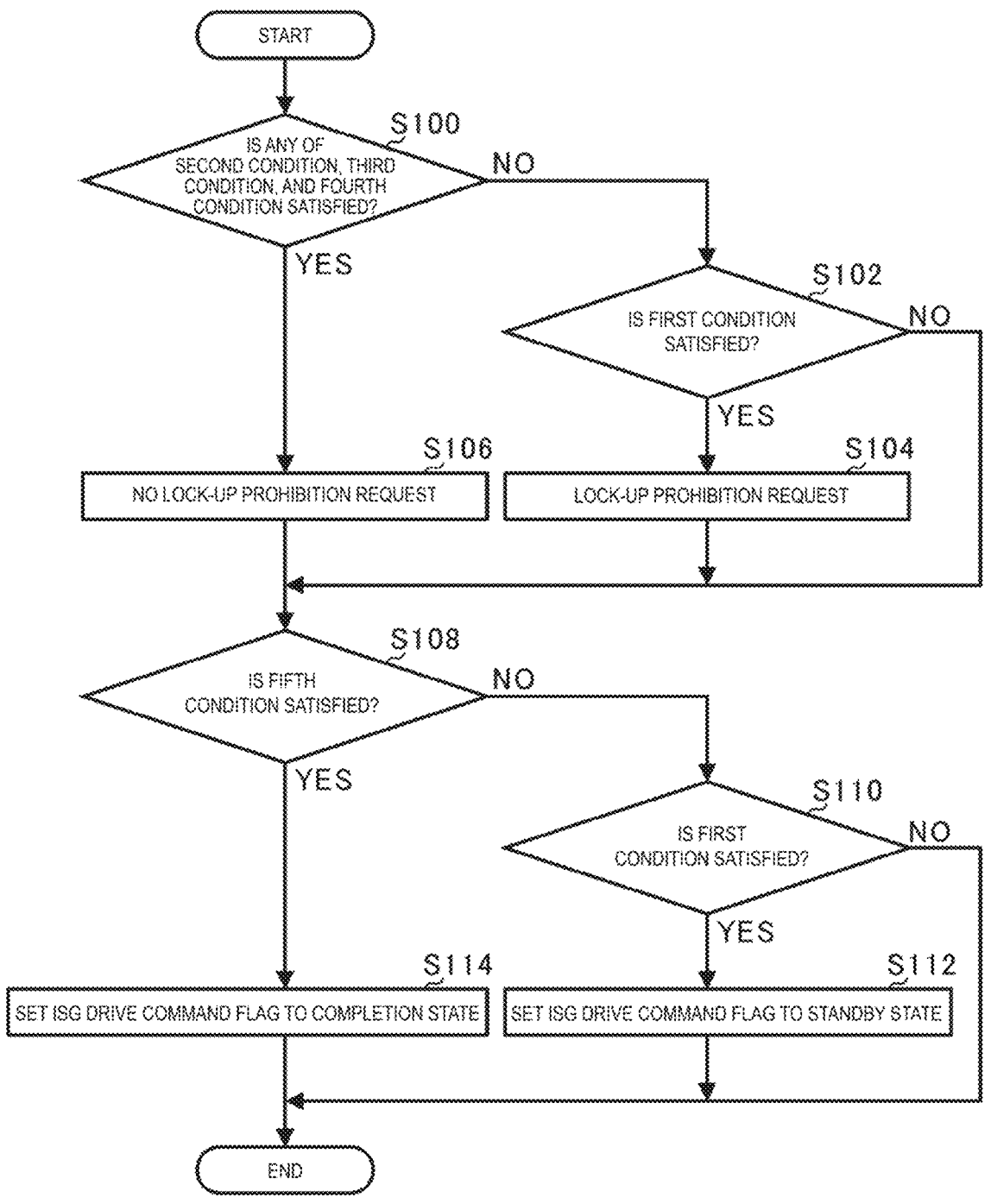
FIG. 3 is a flowchart illustrating a processing flow of a lock-up controller.

FIG. 3 is a flowchart illustrating a processing flow of the lock-up controller 52. This flowchart is repeatedly performed as interruption processing at predetermined time intervals, for example, at intervals of 8 msec.

The lock-up controller 52 determines whether any of a second condition, a third condition, and a fourth condition is satisfied (S100). As a result, when any of the second condition, the third condition, and the fourth condition is satisfied (YES in S100), the lock-up controller 52 proceeds to step S106, and when none of the second condition, the third condition, and the fourth condition is satisfied (NO in S100), the lock-up controller 52 proceeds to step S102. The second condition, the third condition, and the fourth condition are conditions for canceling a lock-up prohibition request, and the details thereof will be described below.

When it is determined that none of the second condition, the third condition, and the fourth condition is satisfied, the lock-up controller 52 determines whether the first condition is satisfied (S102). The first condition is that all of Condition 1-1 to Condition 1-5 described below are satisfied.

Condition 1-1

When the mode switch 50 detects, for example, an operation of the throttle pedal by the driver in a state in which the engine 10 is stopped due to idle reduction or the like, the mode switch 50 determines that used torque has increased and makes a request to start the engine 10. Condition 1-1 is that a request to switch from the motor traveling mode to the engine traveling mode, that is, a request to start the engine 10, is made in the mode switch 50. Instead of the request to start the engine 10, cancellation of an idle reduction request in the mode switch 50 may be used as Condition 1-1.

Condition 1-2

The mode switch 50 makes a request of fuel cut of the engine 10 while the engine 10 is stopped. Condition 1-2 is that the request of fuel cut of the engine 10 is made in the mode switch 50.

Condition 1-3

When the rotational speed of the engine 10 is equal to or higher than the self-recovery lower limit rotational speed, the mode switch 50 can restart the engine 10 at a time of fuel injection and ignition. In other words, when the rotational speed of the engine 10 is lower than the self-recovery lower limit rotational speed, the lock-up controller 52 decreases the rotational speed of the engine 10 at an early stage and attempts to start the engine 10 using the ISG 15. Thus, Condition 1-3 is that the rotational speed of the engine 10 is lower than the self-recovery lower limit rotational speed.

Condition 1-4

When the rotational speed of the engine 10 is equal to or lower than the ISG drive upper limit rotational speed, the mode switch 50 can start the engine 10 by performing engine cranking using the ISG 15. In other words, when the rotational speed of the engine 10 is higher than the ISG drive upper limit rotational speed, the lock-up controller 52 decreases the rotational speed of the engine 10 at an early stage and attempts to start the engine 10 using the ISG 15. Thus, Condition 1-4 is that the rotational speed of the engine 10 is higher than the ISG drive upper limit rotational speed.

Condition 1-5

When the mode switch 50 detects, for example, an operation of the throttle pedal by the driver in a state in which the engine 10 is stopped such as a state in which an idle reduction request is made, the mode switch 50 issues a drive command of the ISG 15 after the rotational speed of the engine 10 becomes equal to or lower than the ISG drive upper limit rotational speed. Condition 1-5 is that the ISG drive command is issued in the mode switch 50. Note that the drive command of the ISG 15 is not issued unless the rotational speed of the engine 10 becomes equal to or lower than the ISG drive upper limit rotational speed, which overlaps with Condition 1-4. This is to determine the first condition more reliably and safely.

When determining that the first condition is satisfied (YES in S102), the lock-up controller 52 proceeds to step S104, and when determining that the first condition is not satisfied (NO in S102), the lock-up controller 52 proceeds to step S108.

When it is determined that the first condition is satisfied, the lock-up controller 52 issues a lock-up prohibition request and prohibits lock-up (S104).

After the lock-up is prohibited in this way, the lock-up is permitted by satisfying any of the second condition, the third condition, and the fourth condition, which are conditions for canceling the lock-up prohibition request (YES in S100). The second condition is that both of Condition 2-1 and Condition 2-2 described below are satisfied. The third condition and the fourth condition indicate the following.

Condition 2-1

When the traveling mode is the engine traveling mode in which the engine 10 operates, there is no need to prohibit the lock-up. Thus, Condition 2-1 is that the current traveling mode is the engine traveling mode.

Condition 2-2

In the present embodiment, the prohibition of the lock-up is maintained until the ISG drive command is acquired after the first condition is satisfied. Thus, the state until the ISG drive command is acquired after the first condition is satisfied is managed using an ISG drive command flag. The ISG drive command flag indicates whether the state is a standby state of waiting for the ISG drive command or a completion state in which the ISG drive command is issued after the first condition is satisfied. In the completion state after the ISG drive command is issued after the first condition is satisfied, there is no need to prohibit the lock-up because the engine 10 is started. When the engine 10 operates and the mode switch 50 does not make a request of fuel cut of the engine 10, there is no need to prohibit the lock-up. Condition 2-2 is that the ISG drive command flag is in the completion state or that no request of fuel cut of the engine 10 is made from the mode switch 50.

Third Condition

Since the engine 10 does not rotate when stalled, the engine 10 can be started by the ISG 15. The third condition is that the engine is stalled.

Fourth Condition

In the present embodiment, when the first condition is satisfied, the lock-up is prohibited. However, there may be a situation in which it is better not to prohibit the lock-up in accordance with the driver's intention or a traveling situation. In this case, the driver can forcibly prohibit the lock-up prohibition request through a predetermined interface. The fourth condition is that the lock-up prohibition request is prohibited.

When it is determined that any of the second condition, the third condition, and the fourth condition is satisfied (YES in S100), the lock-up controller 52 cancels the lock-up prohibition request in a state in which the lock-up prohibition request has been made, and, when no lock-up prohibition request has been made, maintains the state (S106).

Subsequently, the lock-up controller 52 determines whether a fifth condition is satisfied (S108). As a result, when the fifth condition is satisfied (YES in S108), the lock-up controller 52 proceeds to step S114, and when the fifth condition is not satisfied (NO in S108), the lock-up controller 52 proceeds to step S110. The fifth condition is a condition for canceling the standby state, and the details thereof will be described below.

When it is determined that the fifth condition is not satisfied, the lock-up controller 52 determines whether the above-described first condition is satisfied (S110). As a result, when it is determined that the first condition is satisfied (YES in S110), the lock-up controller 52 proceeds to step S112, and when it is determined that the first condition is not satisfied (NO in S110), the lock-up controller 52 ends the processing related to the lock-up.

When it is determined that the first condition is satisfied, the lock-up controller 52 sets the ISG drive command flag to the standby state (S112) in order to manage a state in which the lock-up can be prohibited. Here, in order to determine that the ISG drive command has been issued, the completion state of the ISG drive command flag is once reset.

After the ISG drive command flag is in the standby state in this way, the prohibition of the lock-up is canceled by satisfying the fifth condition, which is a condition for canceling the standby state (YES in S108).

Fifth Condition

As described above, when the ISG drive command is acquired after the first condition is satisfied, there is no need to prohibit the lock-up. The fifth condition is that no ISG drive command is issued.

When it is determined that the fifth condition is satisfied, the lock-up controller 52 determines that the ISG drive command is acquired after the first condition is satisfied and sets the ISG drive command flag to the completion state (S114).

With this configuration, the lock-up can be prohibited when the rotational speed of the engine 10 is lower than the self-recovery lower limit rotational speed and higher than the ISG drive upper limit rotational speed. Thus, the engagement between the crankshaft 10a and the turbine shaft 16d can be avoided in response to the request to start the engine 10, so that the rotational speed of the engine 10 can decrease at an early stage and the engine 10 can be started by the ISG 15.

In addition, since the prohibition of the lock-up is not canceled immediately after the rotational speed of the engine 10 becomes equal to or lower than the ISG drive upper limit rotational speed and the prohibition of the lock-up is canceled after the ISG drive command is issued, the engine 10 can be reliably started.

Figure 4:
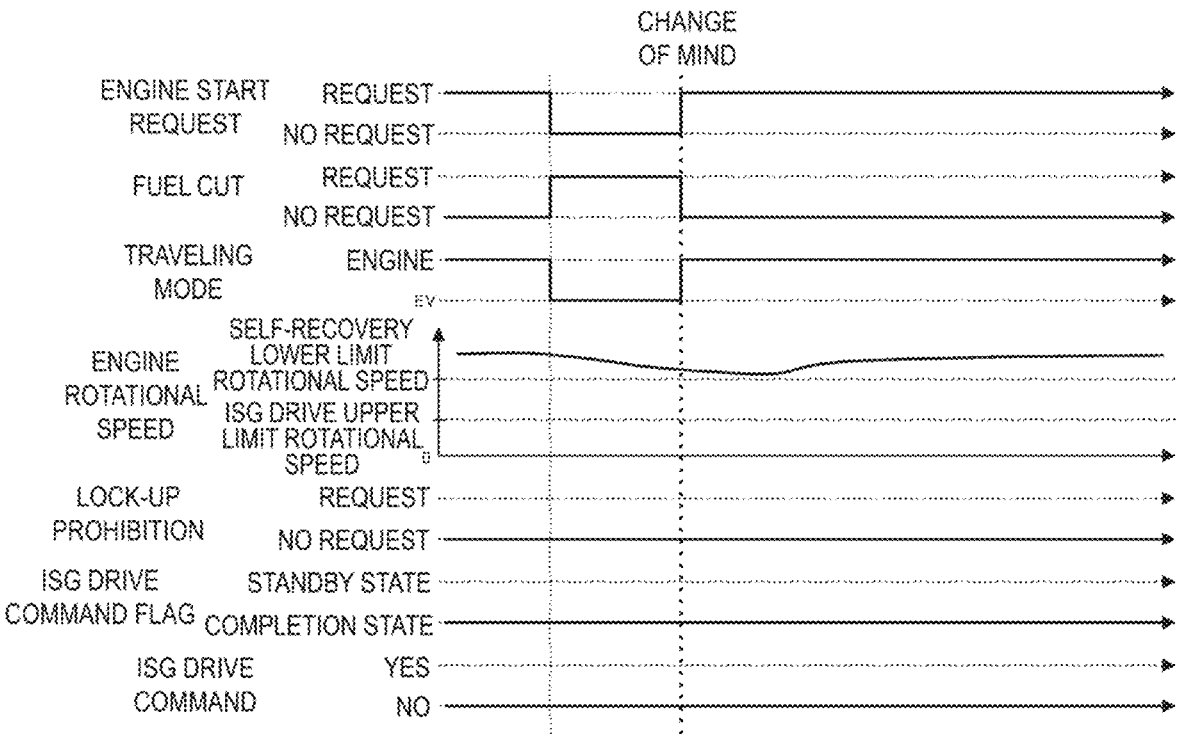
FIG. 4 is a timing chart illustrating an example of a state change of the vehicle.
Figure 5:
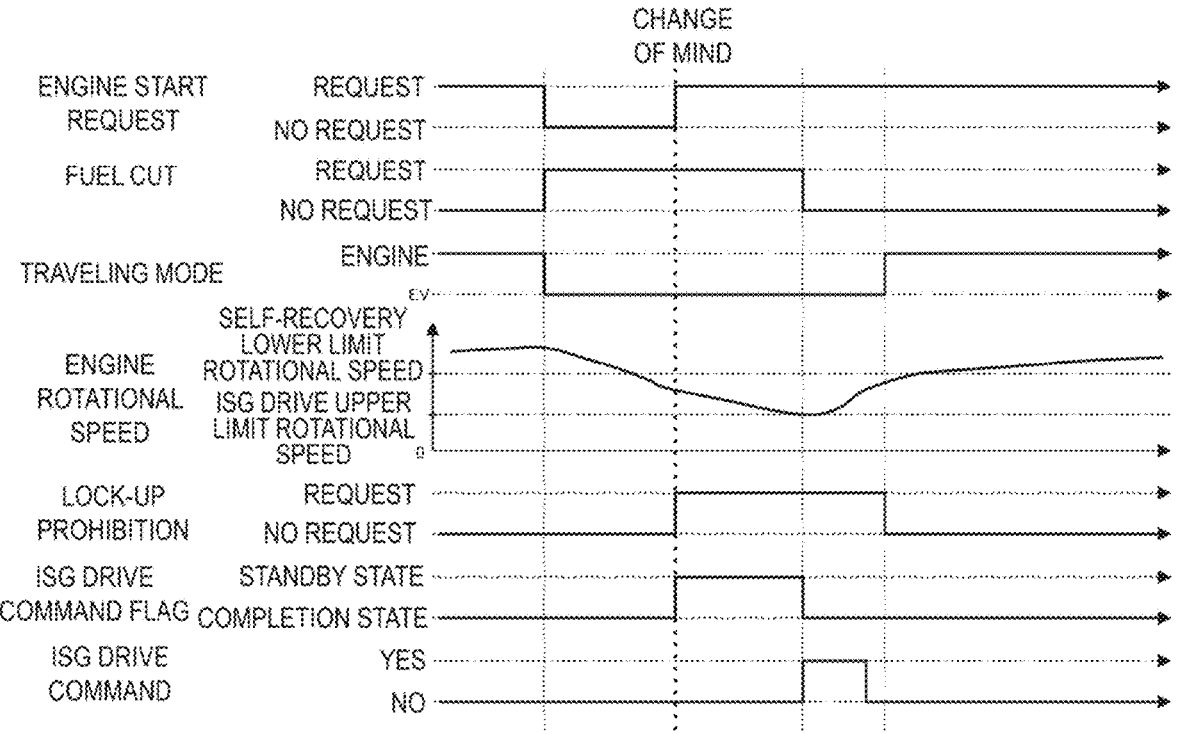
FIG. 5 is a timing chart illustrating an example of a state change of the vehicle.
Figure 6:
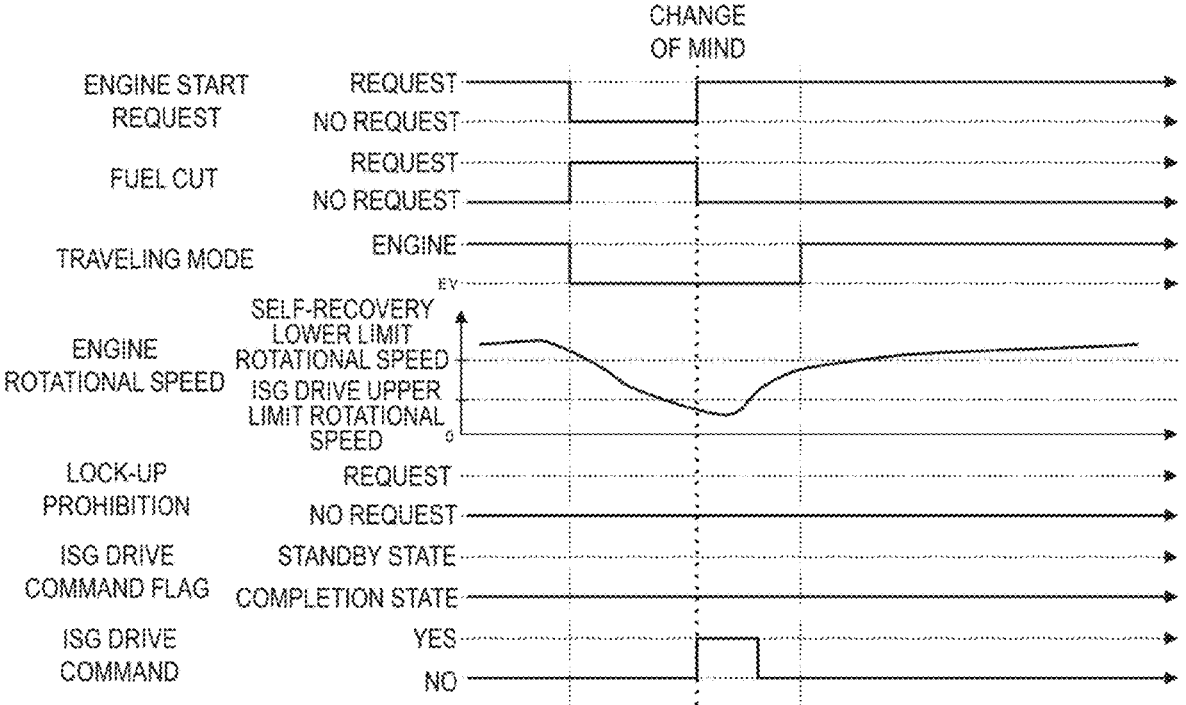
FIG. 6 is a timing chart illustrating an example of a state change of the vehicle.
Figure 7:
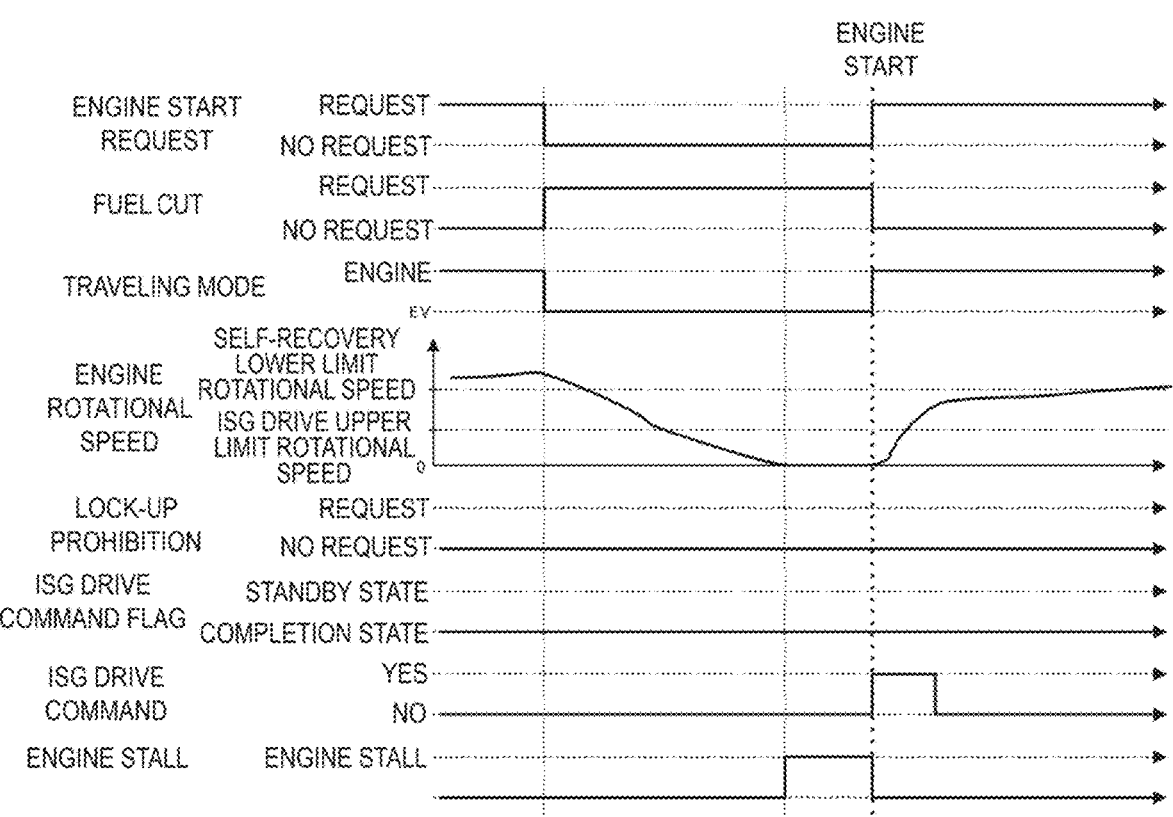
FIG. 7 is a timing chart illustrating an example of a state change of the vehicle.

FIGS. 4 to 7 are timing charts illustrating examples of a state change of the vehicle 1. FIG. 4 illustrates Example 1 in which the driver changes their mind in a state in which the rotational speed of the engine 10 is equal to or higher than the self-recovery lower limit rotational speed. FIG. 5 illustrates Example 2 in which the driver changes their mind in a state in which the rotational speed of the engine 10 is lower than the self-recovery lower limit rotational speed and higher than the ISG drive upper limit rotational speed. FIG. 6 illustrates Example 3 in which the driver changes their mind in a state in which the rotational speed of the engine 10 is equal to or lower than the ISG drive upper limit rotational speed. FIG. 7 illustrates Example 4 in which the engine 10 is started in a state in which the engine is stalled.

Example 1

As illustrated in FIG. 4, it is assumed that the mode switch 50 switches the traveling mode from the engine traveling mode to the EV traveling mode in accordance with torque used for the vehicle 1. In such a case, the rotational speed of the engine 10 gradually decreases.

Here, when the driver changes their mind to increase torque used for the vehicle 1, the mode switch 50 attempts to switch to the engine traveling mode. Here, since the rotational speed of the engine 10 is equal to or higher than the self-recovery lower limit rotational speed, the mode switch 50 restarts the engine 10 at a time of fuel injection and ignition. Since the rotational speed of the engine 10 is equal to or higher than the self-recovery lower limit rotational speed, Condition 1-3 is not satisfied, and thus the first condition is not satisfied. Thus, lock-up is not prohibited. In this way, the mode switch 50 can smoothly switch the EV traveling mode to the engine traveling mode.

Example 2

As illustrated in FIG. 5, it is assumed that the mode switch 50 switches the traveling mode from the engine traveling mode to the EV traveling mode in accordance with torque used for the vehicle 1. In such a case, the rotational speed of the engine 10 gradually decreases.

Here, when the driver changes their mind to increase torque used for the vehicle 1, the mode switch 50 attempts to switch to the engine traveling mode. Here, since the driver changes their mind in a state in which the rotational speed of the engine 10 is lower than the self-recovery lower limit rotational speed and higher than the ISG drive upper limit rotational speed, the engine 10 cannot be immediately started.

At this time, since the traveling mode is not the engine traveling mode, Condition 2-1 is not satisfied, and thus the second condition is not satisfied. Further, since the engine is not stalled, the third condition is not satisfied. Assuming that a lock-up prohibition request is not prohibited, the fourth condition is not satisfied. That is, none of the second condition, the third condition, and the fourth condition is satisfied.

On the other hand, since a request to start the engine 10 is made, Condition 1-1 is satisfied. Further, since a request of fuel cut of the engine is made, Condition 1-2 is satisfied. In addition, since the rotational speed of the engine 10 is lower than the self-recovery lower limit rotational speed, Condition 1-3 is satisfied. Further, since the rotational speed of the engine 10 is higher than the ISG drive upper limit rotational speed, Condition 1-4 is satisfied. Since no ISG drive command is issued at this time, Condition 1-5 is satisfied. That is, the first condition is satisfied.

Thus, the lock-up controller 52 makes a lock-up prohibition request at a time when the driver changes their mind to prohibit lock-up.

Since no ISG drive command is issued yet at this time, the fifth condition is not satisfied. On the other hand, the first condition is satisfied as described above. Thus, the lock-up controller 52 sets an ISG drive command flag to the standby state.

In FIG. 5, since the lock-up is prohibited, the rotational speed of the engine 10 decreases at an early stage and becomes equal to or lower than the ISG drive upper limit rotational speed. When the rotational speed of the engine 10 becomes equal to or lower than the ISG drive upper limit rotational speed, the mode switch 50 does not request fuel cut and issues an ISG drive command. As a result, the engine 10 is started, and the rotational speed of the engine 10 gradually increases.

Because the ISG drive command is issued, the fifth condition is satisfied, so that the lock-up controller 52 sets the ISG drive command flag to the completion state.

When the rotational speed of the engine 10 increases and reaches a stable rotational speed at which it can be determined that the rotational speed is stable, the mode switch 50 switches the traveling mode from the EV traveling mode to the engine traveling mode. When the traveling mode is the engine traveling mode, the second condition is satisfied. Thus, the lock-up controller 52 cancels the lock-up prohibition request.

In the example of FIG. 5, the lock-up can be prohibited when the rotational speed of the engine 10 is lower than the self-recovery lower limit rotational speed and higher than the ISG drive upper limit rotational speed. Thus, since the engagement between the crankshaft 10a and the turbine shaft 16d can be avoided, the rotational speed of the engine 10 can decrease at an early stage, and the engine 10 can be started by the ISG 15.

Example 3

As illustrated in FIG. 6, it is assumed that the mode switch 50 switches the traveling mode from the engine traveling mode to the EV traveling mode in accordance with torque used for the vehicle 1. In such a case, the rotational speed of the engine 10 gradually decreases.

Here, when the driver changes their mind to increase torque used for the vehicle 1, the mode switch 50 attempts to switch to the engine traveling mode. Here, since the rotational speed of the engine 10 is equal to or lower than the ISG drive upper limit rotational speed, the mode switch 50 issues an ISG drive command to start the engine 10. Since the rotational speed of the engine 10 is equal to or lower than the ISG drive upper limit rotational speed, Condition 1-4 is not satisfied, and thus the first condition is not satisfied. Thus, lock-up is not prohibited.

When the rotational speed of the engine 10 increases and reaches a stable rotational speed at which it can be determined that the rotational speed is stable, the mode switch 50 switches the traveling mode from the EV traveling mode to the engine traveling mode.

Example 4

As illustrated in FIG. 7, it is assumed that the mode switch 50 switches the traveling mode from the engine traveling mode to the EV traveling mode in accordance with torque used for the vehicle 1. In such a case, the rotational speed of the engine 10 gradually decreases. It is assumed that the engine 10 is stalled as a result.

Here, when a request to start the engine 10 is made, the mode switch 50 attempts to switch to the engine traveling mode. The mode switch 50 issues an ISG drive command to start the engine 10 and also switches the traveling mode to the engine traveling mode. Here, even when the rotational speed of the engine 10 does not reach a stable rotational speed, the traveling mode transitions to the engine traveling mode from a time of starting the ISG 15. Since the engine is stalled, the third condition is satisfied and lock-up is not prohibited.

A preferred embodiment of the disclosure has been described above with reference to the accompanying drawings, but the disclosure is not limited to such an embodiment. It is apparent to those skilled in the art that various modified examples and modifications may be conceived in the scope of the claims, and it is thus acknowledged that those modified examples and modifications are also naturally included in the technical scope of the disclosure.

A series of processing operations performed by each device (for example, the vehicle 1 and the controller 30) according to the above-described present embodiment may be implemented by any of software, hardware, and a combination of the software and the hardware. A program constituting the software is stored in advance in, for example, a non-transitory storage medium provided inside or outside each device. Then, for example, the program is read from the non-transitory storage medium (for example, a ROM) to a transitory storage medium (for example, a RAM) and executed by a processor such as a CPU.

It is possible to generate a program for implementing each function of each device and install the program in a computer of each device. The processor executes the program stored in the memory, thereby executing the processing of each of the functions. At this time, the program may be executed by processors in a shared manner, or the program may be executed by one processor. In addition, each function of each device described above may be implemented by cloud computing using computers coupled to each other via a communication network. Note that the program may be provided from an external device to the computer of each device by distribution through a communication network and installed.

REFERENCE SIGNS LIST

1 Vehicle
10 Engine
10a Crankshaft
11 Traveling motor
15 ISG (starter motor)
16 Torque converter
16d Turbine shaft
16f Lock-up clutch
30 Controller
50 Mode switch
52 Lock-up controller
The invention claimed is:
1. A vehicle comprising:
an engine;
a starter motor configured to start the engine;
a torque converter configured to amplify torque of a crankshaft coupled to the engine and transmit the torque to a turbine shaft;
a lock-up clutch configured to engage the crankshaft with the turbine shaft to perform lock-up;
a traveling motor; and
a controller, wherein
the controller comprises:
one or more processors; and one or more memories coupled to the one or more processors, the one or more processors are configured to execute processing comprising:

switching between an engine traveling mode in which the vehicle travels using the engine and a motor traveling mode in which the vehicle travels using the traveling motor; and prohibiting, in response to a request to switch from the motor traveling mode to the engine traveling mode, the lock-up when a rotational speed of the engine is lower than a self-recovery lower limit rotational speed and higher than a starter motor drive upper limit rotational speed.

2. The vehicle according to claim 1, wherein the controller is configured to execute processing of prohibiting, in response to the request to switch from the motor traveling mode to the engine traveling mode, the lock-up when the rotational speed of the engine is lower than the self-recovery lower limit rotational speed and higher than the starter motor drive upper limit rotational speed, and the engine is stopped.

3. The vehicle according to claim 1, wherein the controller is configured to, when a drive command of the starter motor is issued after the lock-up is prohibited, execute processing of canceling the prohibition of the lock-up.

4. The vehicle according to claim 3, wherein the controller is configured to, when the drive command of the starter motor is issued after the lock-up is prohibited and the engine is started, execute processing of canceling the prohibition of the lock-up.

* * * * *